3,516,235
LAWN MOWER
Tatsuo Tanoue, Hirakata-shi, Osaka, Japan, assignor to
Kabushiki Kaisha, Toyosha, Osaka, Japan
Filed Feb. 29, 1968, Ser. No. 709,436
Claims priority, application Japan, Dec. 12, 1967,
42/80,741
Int. Cl. A01d 35/24
U.S. Cl. 56—26                                                  3 Claims

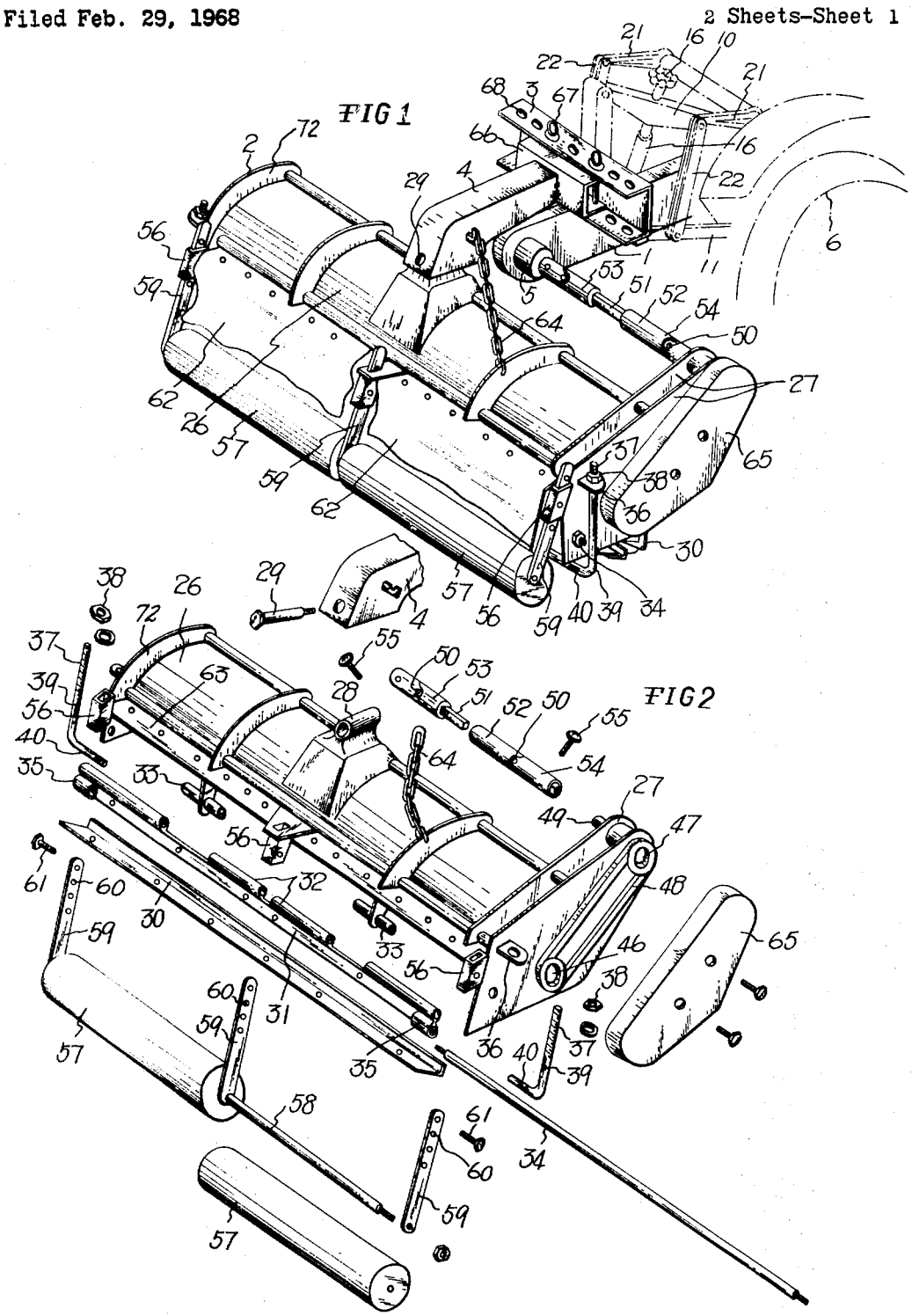

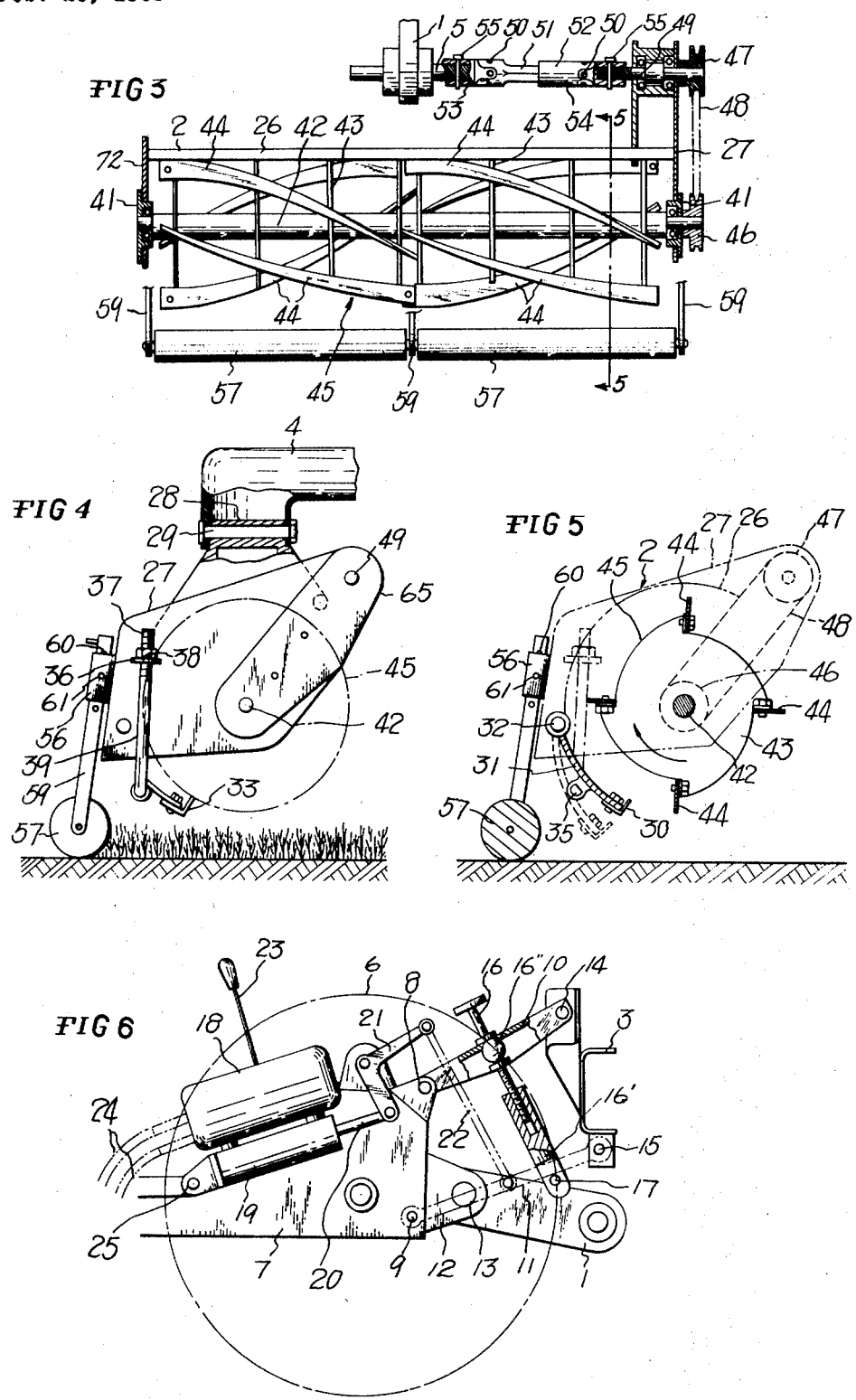

ABSTRACT OF THE DISCLOSURE

A lawn mower is coupled to the rear end of a tractor and effects mowing while being hauled by the tractor. The mower comprises a rotary transmission provided in projected form from the rear end of a tractor and arranged so as to be vertically movable. The lawn mower is coupled to the tractor by a drag hitch, and comprises rotating blades and a fixed blade, suspended at the rear end of the tractor body to effect a highly efficient and speedy lawn mowing operation which cannot be attained by conventional mowing devices.

SUMMARY OF THE INVENTION

The present invention relates to a tractor-hauled lawn mower which is coupled to the rear end of a tractor and effects mowing while being hauled by the tractor, in which mowing is effected particularly by the rotating mowing blades. According to the present invention, a power shaft of the rotary transmission is vertically movable in a projected form at the rear end of the tractor body by means of a link mechanism and combined with a rotating shaft of said rotating blades of the hollow drum-shaped mower composed of the rotating blades and a fixed blade, thus permitting the rotating speed of said power shaft at the rotary transmission to be used as the rotating speed of the mower to appreciably increase the rotating speed of the mower thereby, and to effect a powerful mowing operation and also to enable correct and uniform cutting, and making it possible to easily conduct a highly efficient and high speed lawn mowing operation which could hardly be attained by the conventional mowing devices.

In the conventional tractor-hauled lawn mowers, the driving prime mover mounted on the tractor is used only for running of the tractor itself and the output of the prime mover is determined by considering the weight and size of the apparatus to be hauled by the tractor. Such conventional lawn mower that is coupled to the tractor body through a medium member such as a drag hitch is provided with a cutter assembly comprising a combination of the rotating blades and a fixed blade or the hair-clipper type cutting blades. The rotation of these cutting blades is effected by revolution of an interlocking gear which rotates a gear mounted on the cutter shaft in the inside of the running wheels of the lawn mower, and mowing is effected by the rotating blades and the fixed blade, or by the fixed blade and the forwardly and backwardly moving blades, by making use of rotational centrifugal force of the cutter or forward and backward movements of the cutter in the axial direction.

However, when cutting somewhat lengthy curves by using such conventional types of mowers, unless the blade motion is quickened, the cut grasses are often caught in the engaged blade portions or get entangled with each other, making it difficult to continue the mowing operation. The rotating force of the mower wheels given by hauled running of the mower provides too small driving torque for the cutter, and when a slipping phenomenon is produced on the wheels, the cutters sometimes cease to operate. The cause for such defect is the fact that the rotating speed of the wheels of such mower is the same or slower than the walking speed of a man and that the wheel diameter is limited for obvious reasons, and the rotation or advancing and retrogressing speed of the cutters moved by rotation of such small-diameter wheels can only produce low speed or a small torque. To overcome such defects, it may be considered feasible to provide a speed-augmenting means in the gear system for rotation or forward and backward movements of the cutters driven by said wheels thereby to obtain a rotational difference, but such an attempt even weakening the torque to a greater degree since the force given by the wheels is constant, and the lawn cutting force is accordingly reduced. Particularly in a tractor-hauled type of lawn mower, it is required from an economical viewpoint to widen the mowing scope greater than possible with a manual type mower, and to attain such purpose, it has been a common practice to simply arrange in parallel in the axial direction and couple together several of such cutters as used in a manually operated mower. The actual force for rotating the cutter blades is not associated with the power produced by the tractor but is afforded by rotation of the running wheels of the mower itself, so that it is necessitated to provide such small-sized cutters in plurality in a mutually coupled arrangement. If a single large cutter is used to effect a desired wide scope mowing, the necessary rotating force for such a cutter is hardly obtainable.

Such arrangement inevitably results in complication of the involved mechanisms and increases the frequency of troubles at various parts resulting from such complication. Also, such parallel arrangement of a plurality of small cutters cannot realize uniform and simultaneous movements of all of these cutters when, for example, the tractor is turned, resulting in uneven cropping. The manipulation of such a machine is extremely difficult, and it is also difficult and non-effective to use such machine in a relatively narrow place such as a house garden, and if the ground is uneven, the parallelly arranged cutter blades tend to slant non-uniformly, so that it is impossible to achieve the uniform cutting effect possible with a single enlarged cutter arranged in full length of the mower area. Further, in a mowing system utilizing rotation of the mower wheels, it is required for attaining a powerful mowing effect to reduce the rotating speed of the wheels so as to obtain a strong torque, so that it is quite impossible with such type of mower to achieve a high efficiency and high speed lawn mowing operation corresponding to the high speed running of the tractor.

The present invention is designed to solve these problems. First of all, to provide a high speed rotation to the powerful cutter of the hauled lawn mower, arrangement is made such that the power shaft of the rotary transmission provided in a projected form at the rear end of the tractor body is combined directly or through a suitable interlocking member with the rotating shaft of the cutter composed of the rotating and fixed blades of the mower also coupled to the rear end of the tractor body, whereby to permit an extremely high speed rotation of the cutter and to enable a powerful mowing operation thereby. Also, since said cutter is formed as a single enlarged member arranged in the rotating axial direction, uniform cropping over a wide scope can be attained with improved operating performance. Further, projected provision of the rotary transmission at the tractor body and vertically movable supporting thereof permit up and down movements of the lawn mower in accordance with such movements of the rotary transmission. Still further, the hollow drum-shaped cutter assembly comprising a combination of a band-shaped fixed blade and the focusing rotating blades rotated toward said fixed blade enable easy cutting of not only lawn grasses but also other stouter weeds and shrubs at high speed and high rate. This cutter arrangement also permits smooth and prompt coordination of the mower with the running of the tractor. Such contrivance brings about extreme simplification of the entire necessary mechanism, with resultant easiness of manufacture and limited occurrence of troubles in the apparatus. It is thus possible with the device of the present invention to effect a high speed and highly efficient mowing operation even in a narrow area.

It is therefore an object of the present invention to provide a rotary transmission projected from the rear end of a tractor and disposed vertically movable in relation to the tractor body, and a lawn mower mounted vertically movable by a coupling member such as drag hitch provided in projection at the rear end of the tractor, said lawn mower comprising a hollow drum-shaped cutter assembly composed of a large band-shaped fixed blade arranged in full length of the mower and a plurality of rotating blades rotated toward said fixed blade, and a pair of freely rotatable ground engaging rollers, in which the rotating shaft of said rotating blades is coupled directly or through a suitable transmitting member to the power shaft of said rotary transmission.

It is another object of the present invention to provide a rotary transmission projected from the rear end of a tractor and disposed vertically movable in relation to the tractor body, said rotary transmisson being partly hoisted up by vertically moving links also provided at the rear end of the tractor body, and a lawn mower coupling member such as a drag hitch mounted vertically movable by said links and provided in a projected form at the rear end of the tractor, said lawn mower comprising a hollow drum-shaped cutter assembly composed of a large band-shaped fixed blade arranged in full length of the mower and a plurality of rotating blades rotated toward said fixed blade, and a pair of freely rotatable ground engaging rollers, in which the rotating shaft of said rotating blades is coupled directly or through a suitable transmitting member to the power shaft of said rotary transmission.

It is yet another object of the present invention to provide a rotary transmission projected from the rear end of a tractor and disposed vertically movable in relation to the tractor body, said rotary transmission being partly hoisted up by vertically moving links provided at the rear end of the tractor body; a lawn mower coupling member such as a drag hitch mounted vertically movable by said links in a projected form at the rear end of the body; a hydraulic valve operating mechanism and a hydraulic cylinder which work as the link operating hydraulic mechanism, both being detachably mounted at a side of the tractor body as an integrated unit; and a lawn mower coupled and supported by said coupling member, said lawn mower comprising a hollow drum-shaped adjustable cutter assembly composed of a large band-shaped fixed blade arranged in full length of the mower and a plurality of rotating blades rotated toward said fixed blade, and a pair of freely rotatable ground engaging rollers, in which the rotating shaft of said rotating blades is coupled directly or through a suitable transmitting member to a power shaft of said rotary transmission.

Several preferred embodiments of the present invention will now be described with reference to the attached drawings, in which:

FIG. 1 is a perspective view of the rotary transmission assembled at the rear end of a tractor and a lawn mower according to the present invention.

FIG. 2 is an exploded perspective view of the present lawn mower.

FIG. 3 is a front view, partly shown in longitudinal section, of the coupling mechanism between the lawn mower and the rotary transmission.

FIG. 4 is a side view with parts broken away and shown in section of the lawn mower.

FIG. 5 is a true sectional side view taken along lines 5—5 of FIG. 3.

FIG. 6 is an enlarged side view showing the vertical linking mechanism and the hydraulic operating unit.

Referring to FIG. 1, 1 denotes generally the housing of the rotary transmission from the tractor, 2 the lawn mower, 3 a drag hitch coupled to the lawn mower 2, 4 a supporting rod coupling said hitch 3 and said lawn mower 2, and 5 the power shaft in the rotary transmission. As shown in FIGS. 1 and 6, the rotary transmisson 1 is disposed in a position flanked by the vertically moving links 10 and 11 which have their one end pivotally supported respectively by an upper fulcrum shaft 8 provided at an upper center part of the rear portion 7 where the driving wheels 6 of the tractor are located, and by a lower fulcrum shaft 9 provided across both lower sides of said portion 7. One end of the rotary transmission is pivotally secured to a mounting portion 12 projected backward from the lower center of the tractor portion 7, through a fulcrum shaft 13 so as to be vertically movable. As will be noted, said fulcrum shaft 13 is located rearward of said lower fulcrum shaft 9. The other ends of said links 10, and 11 are connected to the corresponding fulcrum shafts 14 and 15 disposed respectively above and below the drag hitch 3. There are also provided a pair of telescopic lifting rods 16, 16' on said upper link 10, of which the lower rod 16' is coupled to a half way position of the rotary transmission housing 1 through the fulcrum shaft 17. These mechanisms are arranged to permit the lawn mower 2 to move up and down through the drag hitch 3 in accordance with the vertical movements of the rotary transmission housing 1. It is also to be noted that, for effecting up and down movements of the links 10 and 11, a hydraulic valve operating mechanism 18 and a hydraulic cylinder 19 both detachably mounted in the form of an integral unit are provided at a side of the rear portion 7 in such manner that the piston rod 20 of said cylinder 19 is coupled to an end of a bell crank 21 provided on the rear portion 7, while a vertical rod 22 coupled to the other end of said bell crank 21 is connected to said lower link 11. As partly shown in FIG. 1, said bell crank 21 and said vertical rod 22 are provided at both sides forming a pair corresponding to a pair of links of which only 11 is shown. It will also be seen that said hydraulic valve operating mechanism 18 is provided with a control lever 23 and oil pipes 24 connected to a hydraulic pump mounted in the tractor. One end of the cylinder 19 is pivotally secured to rear portion 7.

The lawn mower 2 is detachably secured to said drag hitch 3 through a supporting rod 4 in the manner shown in FIG. 1. Said lawn mower 2, as shown in FIGS. 2 to 5, has a shell 26 covering the upper part thereof and the right and left side panels 27 and 72. A tubular portion 28 projected in the center of said shell 26 is fitted in the supporting rod 4 and secured therein by means of a pin 29. The ledger blade 30 is secured to an arcuate holding plate 31 of which the articulated portions 32 are aligned with and coupled to the corresponding articulated portions 33 formed at the back side of the shell 26 by means of a shaft 34 to thereby swayably suspend the fixed blade 30. It will also be appreciated that a pipe 35 formed at each side of the holding plate 31 receives a bent end 40 of an adjusting rod 39 having its threaded portion 37 screwed into a screw hole 36 in a lug formed at each side panel 27 and 72 and arranged to be fixed in position by a nut 38, whereby to permit optional adjustment of the position of the ledger blade 30 as shown in FIG. 5. Between both side panels 27 and 72 is rotatably mounted a rotating shaft 42 supported by bearings 41 as shown in FIG. 3. On said rotating shaft 42 are parallelly mounted a plurality of plate members 43, and secured at the peripheries of these plates are a plurality of twisted rotating blades 44 disposed crosswise in the axial direction to form as a whole a hollow drum-shaped focusing rotating blade assembly 45. Each of said rotating blades is arranged to face said ledger blade 30. At one end of the rotating shaft 42 is provided a pulley 46, and a corresponding pulley 47 is provided on the side panel 27 on which said pulley 46 is fitted, with a belt 48 being mounted in a stretched state between said both pulleys 46, 47. The shaft 49 of said pulley 47 and the power shaft 5 of the rotary transmission are coupled by pins 55 to an end of a pair of transmission shafts 53, 54 each provided with a universal joint 50 and connected by an angular shaft 51 and a bushing 52 housing said angular shaft. Behind the ledger blade 30 and at the corners of the shell 26 and the side panels 27 and 72 are provided the rectangular cylinders 56 in each of which is vertically adjustably fitted an adjusting rod 59 connected to the shaft 58 for rotatably supporting the ground-engaging rollers 57. Said rod 59 is fitted in the rectangular cylinder 56 and fixed therein at a desired position by a pin 61 which is inserted in one of the holes 60 so as to support the rollers 57 at a desired height from the ground. In the drawings, 62 denotes a pair of tags suspended from the rear edge 63 of the shell 26. 64 is a chain spanned between the supporting rod 4 and the shell 26, while 65 is a cover for the pulleys 46, 47 and the belt 48.

In mounting the lawn mower to the tractor according to the present invention, the coupling portion 66 of the supporting rod 4 is fitted in the drag hitch 3 and secured thereto by means of pins 67 inserted in the holes 68. The other end of the supporting rod 4 is placed over the tubular element 28 of the shell 26 and secured thereto by means of a pin 29. The height of the rollers 57 from the ground surface is adjusted by vertically moving the fixing rod 59 in the rectangular cylinder 56 and fixing same at a desired position by inserting the pin 61 in a hole 60 at the desired position. Adjustment of the distance between the fixed blade 30 and the rotating blade assembly 45 is accomplished by vertically moving the threaded portion 37 of the adjusting rod 39 through a screw hole 36 formed in a lug on each side of the shell 26 and locking the same by means of a nut 38 at the desired position. Since the rotating speed of the power shaft 5 is transmitted to the pulley shaft 49 only via the transmission shafts 53, 54, no loss of power is suffered during transmission unlike in case of using other gear systems, thus permitting full transmission of high-speed rotation of the power shaft through the pulley 47, belt 48 and pulley 46 to the rotating shaft 42 of the rotating blade assembly 45 to rotate same at a high speed. While the tractor runs powered by the prime mover mounted therein, the lawn mower coupled thereto is dragged and runs accordingly therebehind on the ground smoothly through free rotations of the ground-engaging rollers 57. The rotating blades of this assembly, in cooperation with the 30 opposed thereto, cut the lawn grasses grown on the ground in an automatic mowing operation. It is to be noted that the powerful prime mover mounted in the tractor permits transmission of high-speed rotations, say 2000 rotations per minute, of the power shaft 5 of the rotary transmission 1, without suffering any loss at all, to the rotating cutter assembly 45 comprising a plurality of rotating blades 44 which are cylindrically converged, so that an incessant smooth cutting action is performed between these rotating blades and the fixed blade and consequently a large torque is produced, thus assuring an easy but powerful cutting operation. The present device is thus most effectively used not only in a lawn but also in a rough field where weeds including small shrubs are grown. The hollow drum-shaped formation of the rotating cutter assembly 45 helped to reduce weight of the entire cutter assembly, resulting in smooth and light rotation of the blades and elimination of troubles due to deposition, entangling or accumulation of the cut grasses within the machine, thus permitting undisturbed continuation of the powerful cutting operation at high efficiency. This high performance is little affected by the somewhat rugged surface of the ground on which the machine is operated, since the pivotal support of the entire mowing-machine by a tubular element 28 and pin 29 inserted therein permits slanted swaying of the machine both rightwise and leftwise. Further, compactness of the structure which simply comprises a ledger blade 30, a rotary cutter assembly 45 and shell 26 and side panels 27 and 72 that house said blades, allows the mower to faithfully follow right or left turn of the tractor without impairing the working performance, so that a smooth running and mowing operation is assured irrespective of the space area in which mowing is conducted.

In the present invention, vertical movements of the lawn mower are effected interlockingly with the rotary transmission by a combination of the rotary transmission housing 1 which has its one end povitally supported at the rear end of the tractor body so as to be vertically movable, the lawn mower retained by the drag hitch 3 supported by the vertical links 10 and 11 and the lifting rods 16, 16' connecting said link 10 and the rotary transmission 1. Namely, the control lever 23 in the hydraulic valve operating mechanism 18 is operated to move the piston rod 20 of the hydraulic cylinder 19 thereby causing rotation of the bell crank 21 which in turn urges the vertical rod 22 to lift up the lower links 11, whereby in combination with rotation of the upper link 10 about the fulcrum shaft 8, the drag hitch 3 is lifted, thus bringing up therewith the lawn mower from the ground. It will be obvious that the rotary transmission housing 1 is also lifted up along with the mower since the lifting rods 16, 16' provided on the upper link 10 are connected halfway to the rotary mission 1 by a shaft 17. In this case, if the distance between the fulcrum shaft 8 of the upper link 10 and the central fulcrum metal 16" of the lifting rods 16, 16' and the distance between the fulcrum shaft 13 of the rotary transmission housing 1 and the connecting shaft 17 of the lifting rod 16' to the housing 1 are set at a rate of 1:1:1.5, the rotating lift of the drag hitch 3 by the upper and lower links 10 and 11 and that of the housing 1 will be performed while always maintaining an equal distance therebetween. The lifting rods 16, 16' may be moved up and down to lengthen or shorten the total length thereof so that other types of land machines, such as a plough or a harrow, may be coupled to the drag hitch 3 to realize other combinations than the rotary transmission lawn mower combination. Thus the operator, while sitting on the operator's seat in the cabin, can easily manage the vertical movements of the lawn mower and the rotary transmission housing 1 when so desired.

As will be obvious from the above embodiments, the present invention is an arrangement of the rotary transmission projecting from the rear end of the tractor and the lawn mower coupled behind said rotary transmission so that the power shaft of the rotary transmission can be directly connected with the rotating shaft of the lawn mower, whereby exreme speed-up of rotation of the rotating shaft is realized and also a powerful rotating torque is obtained, thus enabling a positive and high speed cropping operation for not only the lawn grasses but also other more coarse grasses. The present device can thus be effectively used not only for mowing in a lawn, but also for grass cropping in a pasture or other grassy fields. Further, since the lawn mower itself is composed of a single compact structure, it can smoothly follow any running manner of the tractor without producing any difficulty in making right or left turn or other manipulations. Still further, provision of a powerful prime mover in the tractor enables an extremely efficient mowing operation over a wide area. The present invention is also characterized by an arrangement which allows simultaneous vertical adjustment of the rotary transmission and the lawn mower, so that when the machine is running on an ordinary road or a rugged place, they are both lifted up sufficiently high from the ground level to make a safe running, and when a mowing operation is conducted, they will both be lowered and adjusted to a suitable position in conformity to the height of the grasses to be cut. Moreover, vertically movable supporting of the ledger blade and a drum-shaped assembly of a plurality of rotating blades provided in opposition to said fixed blade bring about high speed cutting performance and also permit vertical adjustment of the cutting position to cut the grasses at the desired height. It is thus possible to easily and promptly take the most suitable cutting position according to the intended purpose and the surrounding circumstances. The present invention is of fairly simple structure and hence of low cost for manufacturing.

What is claimed is:

1. A lawn mower comprising a rotary transmission provided in projected form from the rear end of a tractor and arranged so as to be vertically movable in relation to said tractor, and a lawn mower mounted vertically movable by a coupling member such as a drag hitch which is also provided in projected form at the rear end of said tractor, said lawn mower comprising an elongated band-shaped fixed blade disposed in full length of said mower, a hollow drum-shaped assembly of a plurality of rotary blades which are rotated toward said fixed blade, and a pair of freely rotatable ground-engaging rollers, in which the rotating shaft of said rotary blades and the power shaft of said rotary mission are coupled together directly or through a suitable transmitting member.

2. A lawn mower comprising, a rotary transmission provided in projected form from the rear end of a tractor and arranged so as to be vertically movable in relation to said tractor, with a part of said rotary mission being held in suspension by the vertically adjusting links also mounted at the rear end of said tractor; a lawn mower coupling member such as a drag hitch provided in projected form at the rear end of said tractor and arranged so as to be vertically movable by said links; and a lawn mower coupled to said drag hitch, said lawn mower comprising an elongated band-shaped fixed blade disposed in full length of said mower, a hollow drum-shaped assembly of a plurality of rotary blades which are rotated toward said fixed blade, and a pair of freely rotatable ground-engaging rollers, in which the rotating shaft of said rotary blades and the power shaft of said rotary transmission are coupled together directly or through a suitable transmitting member.

3. A lown mower comprising, a rotary transmission provided in projected form from the rear end of a tractor and arranged so as to be vertically movable in relation to said tractor, with a part of said rotary mission being held in suspension by the vertically adjusting links mounted at the rear end of said tractor; a lawn mower coupling member such as a drag hitch also provided in projected form at the rear end of said tractor and arranged so as to be vertically movable by said links; a hydraulic valve operating mechanism and a hydraulic cylinder which are composed as an integral unit to work as a hydraulic mechanism for operation of said links and detachably mounted at a side of the tractor body; and a lawn mower coupled to said coupling member, said lawn mower comprising an elongated band-shaped fixed blade disposed in full length of said mower, a hollow drum-shaped adjustable assembly of a plurality of rotary blades which are rotated toward said fixed blade, and a pair of freely rotatable ground-engaging rollers, in which the rotating shaft of said rotary blades and the power shaft of said rotary transmission are coupled together directly or through a suitable coupling member.

References Cited

UNITED STATES PATENTS

| 2,764,864 | 10/1956 | Kinkead | 56—7 |
| 2,974,463 | 3/1961 | Lewis | 56—7 |
| 2,974,472 | 3/1961 | Gebhart | 56—504 |

FOREIGN PATENTS

| 769,396 | 3/1957 | Great Britain. |

RUSSELL R. KINSEY, Primary Examiner